(12) United States Patent
Charny

(10) Patent No.: US 7,668,090 B1
(45) Date of Patent: Feb. 23, 2010

(54) SETTING PRE-CONGESTION NOTIFICATION ADMISSION AND PREEMPTION THRESHOLDS IN COMPUTER NETWORKS

(75) Inventor: Anna Charny, Sudbury, MA (US)

(73) Assignee: Cisco Technology, Inc., San Jose, CA (US)

( * ) Notice: Subject to any disclaimer, the term of this patent is extended or adjusted under 35 U.S.C. 154(b) by 339 days.

(21) Appl. No.: 11/895,445

(22) Filed: Aug. 24, 2007

(51) Int. Cl.
*H04L 12/26* (2006.01)
(52) U.S. Cl. .................................................. 370/230
(58) Field of Classification Search ................ None
See application file for complete search history.

(56) References Cited

U.S. PATENT DOCUMENTS

| | | | |
|---|---|---|---|
| 2007/0291643 A1* | 12/2007 | Charny et al. ............... | 370/230 |
| 2008/0112316 A1* | 5/2008 | Charny et al. ............... | 370/230 |
| 2008/0130502 A1* | 6/2008 | Charny et al. ............... | 370/235 |

OTHER PUBLICATIONS

Menth et al., "PCN-Based Resilient Network Admission Control: The Impact of a Single Bit", University of Wurzburg, Institute of Computer Science, Germany, 2007.
Briscoe et al., "Pre-Congestion Notification marking", IETF Internet Draft, draft-briscoe-tsvwg-cl-phb-02.txt, Jun. 26, 2006.
Briscoe et al., "A Framework for Admission Control over DiffServ using Pre-Congestion Notification", IETF Internet Draft, Mar. 6, 2006.
Briscoe et al., "An edge-to-edge Deployment Model for Pre-Congestion Notification: Admission Control over a DiffServ Region", IETF, Jun. 26, 2006.
Eardley et al., "Pre-Congestion Notification Architecture", IETF Internet Draft, Jun. 20, 2007.
Charny et al., "Pre-Congestion Notification Using Single Marking of Admission and Pre-emption", IETF Internet Draft, Mar. 5, 2007.

* cited by examiner

*Primary Examiner*—Anh-Vu Ly
(74) *Attorney, Agent, or Firm*—Cindy Kaplan

(57) ABSTRACT

A method and apparatus for setting admission and preemption thresholds in a computer network are disclosed. In one embodiment, a method includes receiving traffic information including a first bandwidth utilization on each link located between ingress nodes and egress nodes based on a traffic matrix with no failures at the nodes or the links, and a second bandwidth utilization on each of the links based on the traffic matrix with planned failures at one or more of the links or the nodes. A preemption-to-admission ratio is calculated based on the first and second bandwidth utilizations on the links. An admission threshold is calculated at one of the links based on the second bandwidth utilization on the link and the preemption-to-admission ratio. At least one of the preemption-to-admission ratio and admission threshold is transmitted to a network device for use in flow admission.

20 Claims, 3 Drawing Sheets

SETTING PRE-CONGESTION NOTIFICATION ADMISSION AND PREEMPTION THRESHOLDS IN COMPUTER NETWORKS

BACKGROUND OF THE INVENTION

The present disclosure relates generally to setting pre-congestion notification (PCN) admission and preemption thresholds in computer networks.

The IETF (Internet Engineering Task Force) has proposed methods for measurement based admission control and preemption techniques. (See e.g., B. Briscoe et al., "A Framework for Admission Control over DiffServ using Pre-Congestion Notification", IETF draft-briscoe-tsvwg-cl-architecture-03.txt, Jun. 26, 2006, B. Briscoe et al., "Pre-Congestion Notification Marking", IETF draft-briscoe-tsvwg-cl-phb-02.txt, Jun. 26, 2006, and P. Eardley, "Pre-Congestion Notification Architecture", IETF draft-eardley-pcn-architecture-00, Jun. 20, 2007, which are incorporated by reference herein in their entirety). The method relies on core nodes providing explicit notification information to edge nodes when the traffic load on a core link reaches certain levels. The edge nodes use some of this explicit notification information to decide whether new calls should be accepted. This is referred to as a flow "Admission" process. The edge nodes may also use some explicit notification information to drop calls that are already in place if needed. This is referred to as a flow "Preemption" (also known as "termination") process. In order to provide the explicit notification information, the core node meters voice traffic load on each link, and when it reaches predefined thresholds the core node sets particular bits in the header of packets (PCN-bits).

An important requirement for the admission control and preemption technique described above is that the admission and preemption processes are able to react at different load thresholds. The current approach thus uses two separate thresholds; one for limiting admission of new flows under normal circumstances, and one for preempting traffic if unexpected conditions such as network failures or sudden changes in traffic matrix occur.

The proposed methods for admission control and preemption described above do not address how to set the thresholds used in congestion and pre-congestion notification.

DESCRIPTION OF EXAMPLE EMBODIMENTS

Overview

A method and apparatus for setting pre-congestion notification admission and preemption thresholds in a computer network are disclosed.

In one embodiment, a method generally comprises receiving at a processor traffic information comprising a first bandwidth utilization on each link located between one or more ingress nodes and one or more egress nodes based on a traffic matrix with no failures at the nodes or the links, and a second bandwidth utilization on each of the links based on the traffic matrix with planned failures at one or more of the links or the nodes. A preemption-to-admission ratio is calculated based on the first and second bandwidth utilizations on the links. An admission threshold is calculated at one of the links based on the second bandwidth utilization on the link and the preemption-to-admission ratio. At least one of the preemption-to-admission ratio and admission threshold is transmitted to a network device for use in flow admission.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A method and system disclosed herein are used to configure PCN (pre-congestion notification) admission and preemption thresholds which are used in marking traffic for use in flow admission. The threshold settings are computed to ensure compatibility with any capacity/resiliency planning so that if traffic remains within the planned amounts, the planned amount of traffic is admitted and protected against all planned failure scenarios. Computed PCN thresholds are used to control traffic in unplanned scenarios. The system and method may be used to compute PCN parameters needed to configure routers appropriately for admission control and preemption. The system and method may also be used in planning and network configuration applications to configure PCN thresholds.

Figure 1:
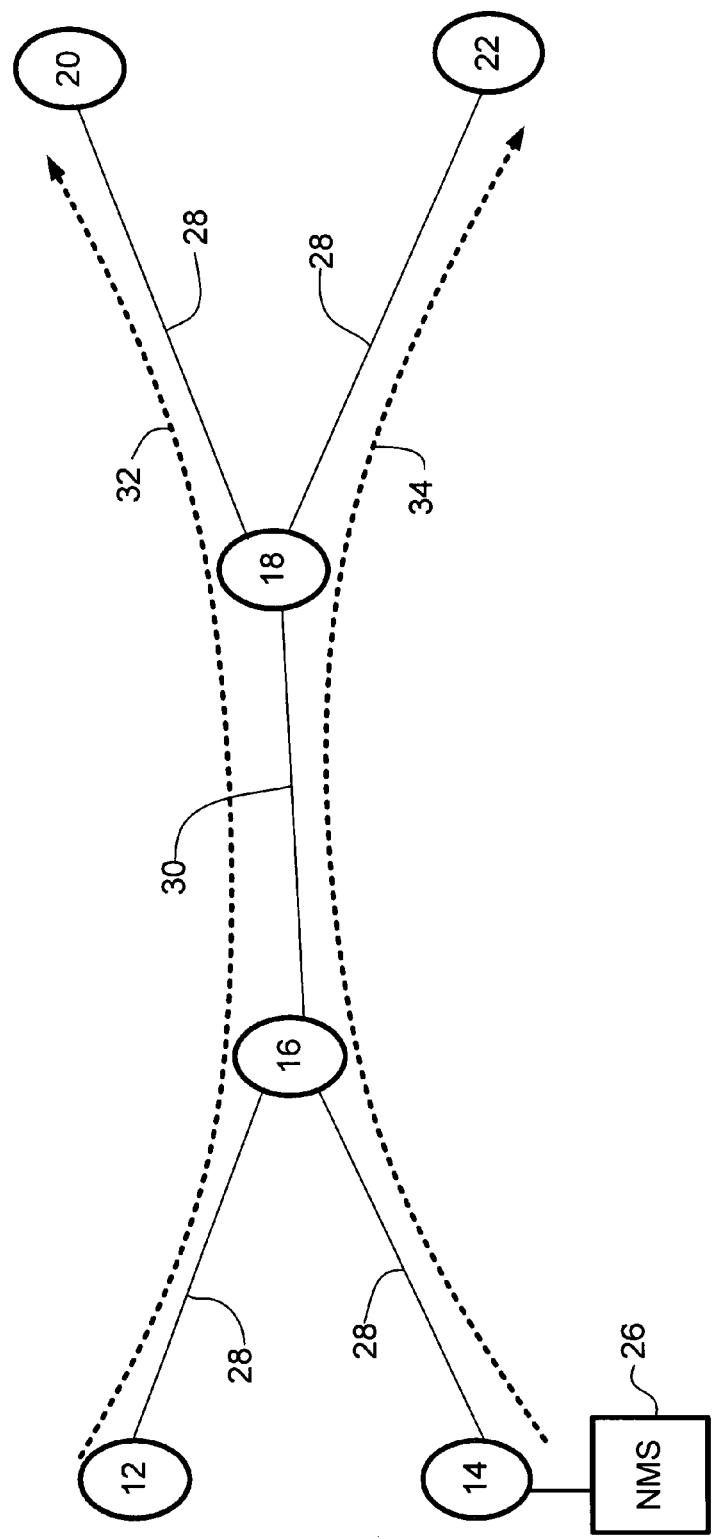
FIG. 1 illustrates an example of a network in which embodiments described herein may be implemented.

Referring now to the drawings, and first to FIG. 1, an example of a network that may implement embodiments described herein is shown. For simplification, only a small number of nodes are shown. The embodiments operate in the context of a data communication network including multiple network elements. The network shown in FIG. 1 includes edge nodes 12, 14, 20, 22, core nodes 16, 18, and a network management station (NMS) 26. The edge nodes may be ingress or egress edge nodes, depending on the direction of the traffic flow. Adjacent nodes are coupled via one or more communication paths (links). In FIG. 1, the edge nodes are connected to the core nodes via links 28 and the core nodes are connected via link 30.

The network management station 26 may be located at a network device in communication with nodes 12, 14, 16, 18, 20, 22 through one or more links, or the network management station may be located at one of nodes. Also, the network management station may not be connected to the network. Some of the nodes in a network that employs the embodiments may be network devices such as routers or gateways. The system and method described herein may be implemented at the network management station 26 or at one of the nodes, or another network device in communication with one or more of the nodes. The network device may include, for example, a master central processing unit (CPU), interfaces, and a bus. The CPU preferably includes memory and a processor. The network device may be implemented on a general purpose network host machine such as a computer system or network device described below with respect to FIG. 3.

Referring again to the network shown in FIG. 1, traffic passes along path 32 from ingress edge node 12 through core (interior nodes) 16, 18 to egress edge node 20. Traffic is also routed from ingress edge node 14 to egress edge node 22 through core nodes 16 and 18 via path 34. The core nodes 16, 18 meter traffic and mark packets as required. The edge nodes 12, 14, 20, 22 use the metering and marking to perform flow admission and preemption based on the calculated admission and preemption thresholds.

The network uses a metering and marking scheme (e.g., Token-bucket+excess marking, or other suitable metering and marking scheme) that is able to convey to the egress edge node the rate of traffic (for a given ingress/egress pair) that traverses the core while being under the metered rate on every link. The core routers 16, 18 mark all packets which exceed the configured admission threshold with an "Admission Threshold Exceeded" codepoint. The edge nodes may use this admission metering and marking to perform flow admission as defined, for example, in IETF draft-briscoe-tsvwg-cl-architecture-03.txt (referenced above).

The system and method described herein are used to set admission and (implicit) preemption thresholds for a network utilizing a single metering/marking scheme to enforce both thresholds. For example, the system and method may be used to set the explicit admission threshold on all links, and compute a system-wide preemption-to-admission ratio that defines the (implicit) preemption threshold on all links.

The use of a single metering/marking scheme reduces implementation requirements on core routers and reduces the number of codepoints needed in a very scarce resource (PCN-bits in packet header). One example of a single metering/marking scheme is described in U.S. patent application Ser. No. 11/541,964, entitled "Stateless Call Admission and Call Preemption with a Single Metering and Marking Scheme", filed Oct. 2, 2006, and Internet Draft entitled "Pre-Congestion Notification Using Single Marking for Admission and Preemption", A. Charny et al., Mar. 5, 2007 (draft-charny-pcn-single-marking-02.txt), which are both incorporated herein by reference. This single marking scheme uses a rate-based metering scheme for flow admission and then imposes a system-wide restriction on the ratio between a configured admission threshold and preemption threshold. Admission marking is also used to make preemption decisions. In this method, there is no explicit preemption threshold at the core routers. Instead, there is an implicitly assumed preemption threshold which is within a fixed constant factor of the configured admission threshold. This constant factor is the same for all core nodes in the PCN region and is referred to as the system-wide preemption-to-admission ratio. The preemption threshold is therefore referred to as "implicit" preemption threshold. The edge nodes of the PCN domain derive the bottleneck implicit preemption threshold from the knowledge of the amount of admission-marked and un-marked traffic received at the egress PCN node from a given ingress node. These quantities are communicated to the ingress node, which then derives the (implicit) bottleneck preemption threshold by multiplying the amount of unmarked traffic by the value of the system-wide preemption-to-admission ratio.

It is to be understood that the admission and preemption control technique described above is only an example and the systems and methods described herein may be used to set admission and preemption thresholds in networks utilizing other admission control and preemption techniques, without departing from the scope of the invention.

As described below, admission and (implicit) preemption threshold values are calculated using link utilization values based on the knowledge of a given traffic matrix and the network topology. The traffic matrix is a set of bandwidths of all edge-to-edge flows across a PCN network region. Traffic matrix data may be collected using technologies such as MPLS-TE, NetFlow, or other methods, as is well known by those skilled in the art. Once the traffic matrix is identified, provisioning (planning/optimization) tools are used to simulate or optimize placement of traffic based on available link capacities and desired resiliency against a set of failures. For a given traffic matrix, the tools may be used to compute utilization on all links with and without a set of failures and may be optionally used to optimize link metrics along the way. Examples of planning tools with such functionality are applications provided by Cariden Technologies, Inc. of Mountain View, Calif. and OPNET Technologies, Inc. of Bethesda, Md. It is to be understood that these planning and traffic engineering applications are only examples and that other simulation, planning, and optimization tools may be used, without departing from the scope of the invention.

The admission and (implicit) preemption thresholds are used in determining when to admit new traffic or drop existing traffic. In a provisioned, resilient network, pre-congestion notification is generally not needed under normal operating conditions (i.e., when the traffic matrix is within planned constraints) or when only planned failure scenarios occur. However, it is difficult to plan for multiple failures, and even planning for single SRLG (Shared Risk Link Group) and node failures may prove very expensive in many cases. Furthermore, the planning tools discussed above assume a given traffic matrix and any substantial deviations from the planned traffic matrix are typically not accounted for in the planning. It is for such unplanned traffic deviations or unplanned failures that pre-congestion notification is used to control traffic even under possibly rare events which may have a devastating impact on the network.

When using pre-congestion notification in conjunction with the provisioning tools, it is important to make sure that PCN admission and preemption thresholds are set in such a way as to allow for admission of at least the planned traffic matrix in the non-failure case. Therefore, at least the planned amount of traffic is protected against each of the planned failure scenarios. The PCN thresholds are preferably set so that network utilization is not any worse under planned scenarios with the planned traffic matrix (i.e., admit at least the planned amount of traffic and ensure that at least the planned amount of traffic is protected against planned failures) while controlling traffic preemption and admission in the unplanned scenario. Controlling the traffic means that if more traffic than planned is admitted or an unexpected failure scenario occurs causing preemption thresholds to be exceeded on some links, excess traffic will be preempted, preserving the QoS of the remaining traffic. As described above, in the single-marking approach the preemption threshold is only implicit. Therefore, in the case of single-marking approach, setting preemption and admission thresholds is the generally the same as setting the admission thresholds on all links and defining the system-wide preemption-to-admission ratio.

The following describes calculation of an admission threshold $A(i)$ and preemption threshold $P(i)$ or system-wide preemption-to-admission ratio k on link (i) in a network utilizing a single marking scheme.

Two bandwidth utilization values $U(i)$, $R(i)$ are identified for each link located between the ingress and egress nodes using a planning/optimization tool as previously described. The first bandwidth utilization $U(i)$ is defined as utilization on link (i) when the planned traffic matrix is placed without failure. The second bandwidth utilization R(i) is defined as utilization on link (i) for the planned traffic matrix under the worst planned failure conditions. As described above, these values may be derived from a planning or optimization tool for a given matrix.

At least some bandwidth may be reserved for non-PCN traffic on each link under all circumstances. A bandwidth capacity C(i) is defined as the remaining bandwidth capacity available to PCN traffic and may be set by policy or network administrator, for example. In some cases no bandwidth capacity is reserved for non-PCN traffic, in which case C(i) may be equal to link speed.

Two constants (w, k) are defined based on one or more of the bandwidth utilization or capacity values, for use in threshold calculations. The first constant w is defined as the minimum value on all links of the bandwidth capacity available to PCN traffic on a link divided by the bandwidth utilization on the link for the worst planned failure:

$$w = \min\_i(C(i)/R(i))$$

The second constant k is defined as the minimum value on all links of the bandwidth utilization on a link for the worst planned failure divided by the bandwidth utilization on the link without failure:

$$k = \min\_i(R(i)/U(i))$$

The first constant w is used to set the (implicit) preemption threshold on all links. The second constant k is the system wide preemption-to-admission ratio.

The admission threshold A(i) and preemption threshold P(i) are then calculated as follows:

For all i:

$$P(i) = wR(i)$$

$$A(i) = P(i)/k$$

The system wide preemption-to-admission ratio is thus:

$$k = P(i)/A(i)$$

If P(i)<C(i) then both A(i) and P(i) may be optionally scaled up to generally obtain P(i)=C(i).

As can be observed from the foregoing, if M is the planned traffic matrix, then wM admitted traffic is still protected against all planned failures. More traffic than wM may be admitted, however, not all of this excess traffic is guaranteed to be protected.

It should be noted that in the single marking approach, the value A(i), is explicitly configured on link i, while the value P(i) is implicit and not configured. The system-wide preemption-to-admission ratio k is preferably known to all nodes in the PCN network. While it is necessary to compute P(i) for the single-marking approach (because it is used to compute A(i)), P(i) may not be explicitly configured at the routers. The parameter k used in the computation above is used as a system-wide Preemption/Admission ratio constant in the single-marking ingress setup described in Internet Draft entitled "Pre-Congestion Notification Using Single Marking for Admission and Preemption", referenced above. For example, the Preemption/Admission ratio k at link 30 between core nodes 16 and 18 in the network of FIG. 1, may be used along with a measured rate of traffic that passes through the core without being marked, to calculate a sustainable admission rate and preemption rate, which may be used to reduce the available bandwidth at each ingress node 12, 14 for admission control and preemption at the ingress nodes.

Figure 2:
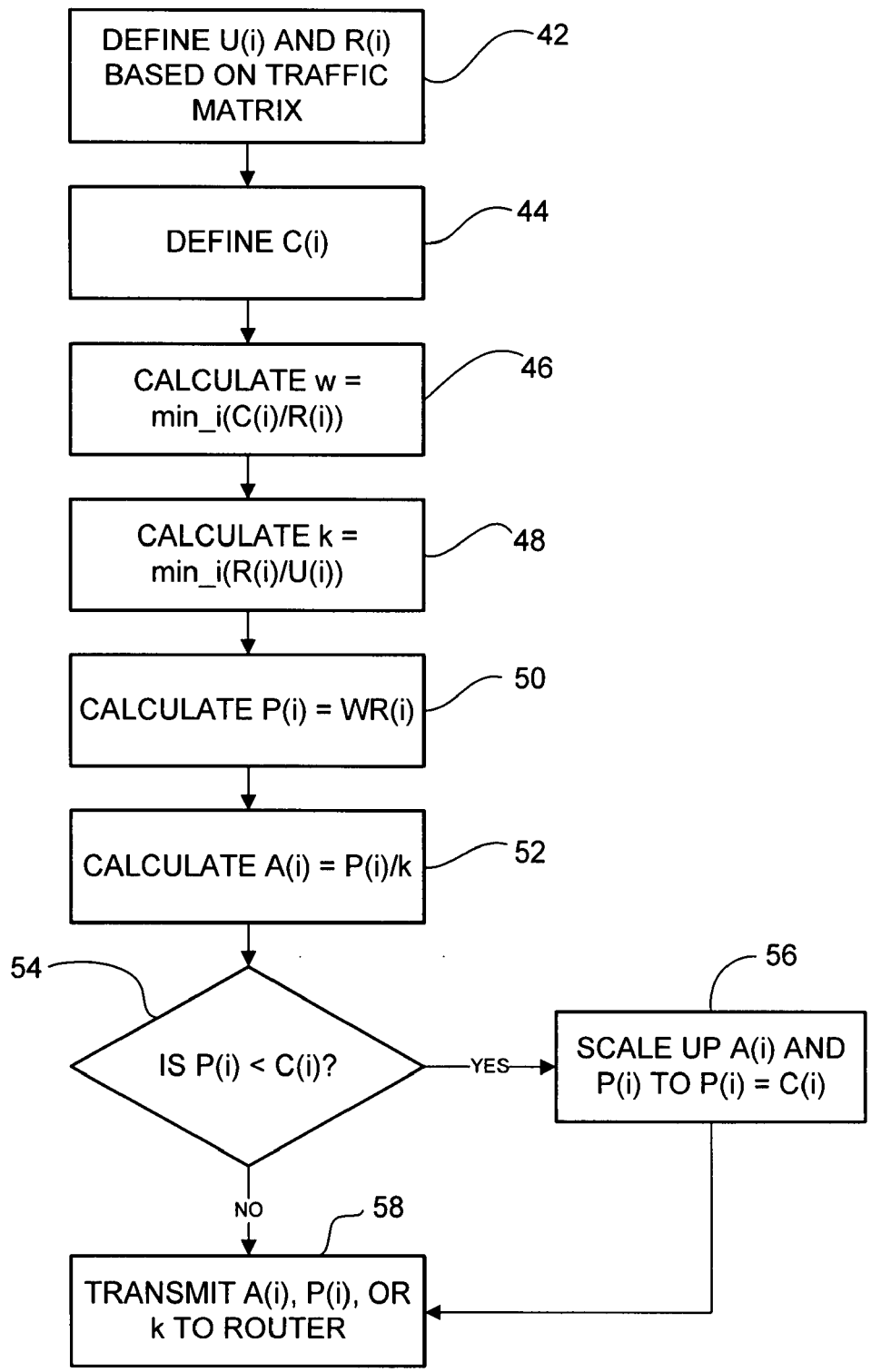
FIG. 2 is a flowchart illustrating one example of a process for setting PCN admission and preemption thresholds in a network.

A flowchart illustrating one embodiment of the process described above for setting admission and preemption thresholds is shown in FIG. 2. At step 42, U(i) and R(i) are defined based on a given traffic matrix. As previously discussed, various planning tools may be used to identify bandwidth utilization values based on a given traffic matrix. This traffic information may be sent to another network device for use in calculating the admission and preemption thresholds, or the calculations may be performed at the same network device having the planning tools used to define the utilization values. Thus, the traffic information received at a processor performing the threshold calculations may be received from an external port or generated internally.

The bandwidth capacity available for PCN traffic (C(i)) is defined at step 44. At step 46 the minimum ratio of C(i)/R(i) is calculated. At step 48 the minimum ratio of R(i)/U(i) is calculated. The preemption threshold and admission threshold are then calculated at steps 50 and 52, respectively. If the preemption threshold is less than the bandwidth capacity available for PCN traffic, both the admission threshold and preemption threshold are scaled up so that the preemption threshold is generally equal to the bandwidth capacity available to PCN traffic (steps 54 and 56). One or more of the admission threshold A(i), preemption threshold P(i), or second constant k are transmitted to a router for use in marking and flow admission (step 58). For example, the admission threshold may be transmitted to a core router and the preemption-to-admission ratio transmitted to an edge router. If the admission and preemption threshold calculations are performed at the router to be configured, the values are transmitted internally within the network device. Otherwise, the threshold values are transmitted to the router to be configured with the PCN threshold values.

Figure 3:
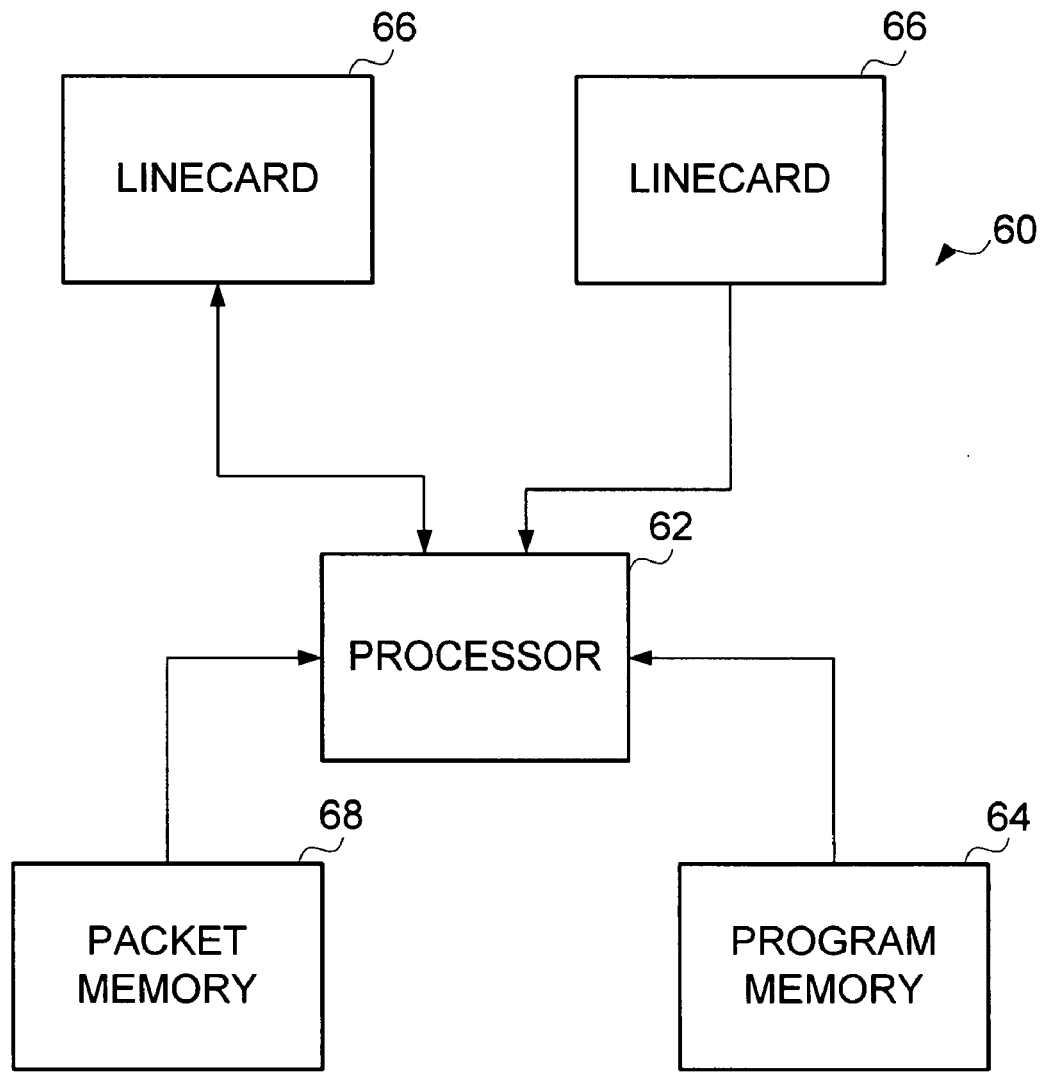
FIG. 3 depicts an example of a network device useful in implementing embodiments described herein.

FIG. 3 depicts a network device 60 that may be used to implement embodiments described herein. In one embodiment, network device 60 is a programmable machine that may be implemented in hardware, software, or any combination thereof. A processor 62 executes codes stored in a program memory 64. Program memory 64 is one example of a computer-readable medium. Program memory 64 can be a volatile memory. Another form of computer-readable medium storing the same codes would be some type of non-volatile storage such as floppy disks, CD-ROMs, DVD-ROMs, hard disks, flash memory, etc. A carrier wave that carries the code across the network is an example of a transmission medium.

Network device 60 interfaces with physical media via a plurality of linecards 66. Linecards 66 may incorporate Ethernet interfaces, DSL interfaces, Gigabit Ethernet interfaces, 10-Gigabit Ethernet interfaces, SONET interfaces, etc. As packets are received, processed, and forwarded by network device 60, they may be stored in a packet memory 68. To implement functionality according to the system, linecards 66 may incorporate processing and memory resources similar to those discussed above in connection with the network device as a whole.

Although the method and system have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method comprising:
   receiving at a processor traffic information comprising a first bandwidth utilization on each link located between one or more ingress nodes and one or more egress nodes based on a traffic matrix with no failures at the nodes or the links, and a second bandwidth utilization on each of the links based on said traffic matrix with planned failures at one or more of the links or the nodes;

calculating a preemption-to-admission ratio based on said second bandwidth utilization and said first bandwidth utilization on the links;

calculating an admission threshold at one of the links based on said second bandwidth utilization on the link and said preemption-to-admission ratio; and transmitting at least one of said preemption-to-admission ratio and said admission threshold to a network device for use in flow admission.

2. The method of claim 1 further comprising determining a constant based on a bandwidth capacity available for pre-congestion notification traffic and said second bandwidth utilization on the links and wherein calculating said admission threshold further comprises multiplying said second bandwidth utilization on the link by said constant.

3. The method of claim 1 further comprising calculating a preemption threshold at the link by multiplying said second bandwidth utilization on the link by a minimum ratio of a bandwidth capacity available for pre-congestion notification traffic and said second bandwidth utilization on the links.

4. The method of claim 1 further comprising:
calculating a preemption threshold on the link based on said second bandwidth utilization on the link;
determining if said preemption threshold is less than a bandwidth capacity available for pre-congestion notification traffic on the link; and
if said preemption threshold is less than said bandwidth capacity, increasing said admission threshold and said preemption threshold so that said preemption threshold is generally equal to said bandwidth capacity available for pre-congestion notification traffic on the link.

5. The method of claim 1 wherein the network device is a core router and transmitting at least one of said preemption-to-admission ratio and said admission threshold comprises transmitting said admission threshold to the core router for use in marking traffic.

6. The method of claim 1 wherein the network device is an edge router and transmitting at least one of said preemption-to-admission ratio and said admission threshold comprises transmitting said preemption-to-admission ratio to said edge router.

7. The method of claim 1 wherein calculating said preemption-to-admission ratio comprises calculating a ratio between said second bandwidth utilization and said first bandwidth utilization for each of the links and selecting a minimum ratio for said preemption-to-admission ratio.

8. An apparatus comprising:
a processor operable to receive traffic information comprising a first bandwidth utilization on each link located between one or more ingress nodes and one or more egress nodes based on a traffic matrix with no failure at the nodes or links, and a second bandwidth utilization on each of the links based on said traffic matrix with planned failures at one or more of the links or nodes, the processor configured to calculate a preemption-to-admission ratio based on said second bandwidth utilization and said first bandwidth utilization on the links, calculate an admission threshold at one of the links based on said second bandwidth utilization on the link and said preemption-to-admission ratio, and transmit at least one of the preemption-to-admission ratio and said admission threshold to a network device for use in flow admission; and
memory for storing said traffic information.

9. The apparatus of claim 8 wherein the processor is configured to determine a constant based on a bandwidth capacity available for pre-congestion notification traffic and said second bandwidth utilization on the links and utilize said constant in calculating said admission threshold.

10. The apparatus of claim 8 wherein the processor is configured to calculate a preemption threshold on the link based on said second bandwidth utilization on the link, determine if said preemption threshold is less than a bandwidth capacity available for pre-congestion notification traffic on the link, and if said preemption threshold is less than said bandwidth capacity, increase said admission threshold and said preemption threshold so that said preemption threshold is generally equal to said bandwidth capacity available for pre-congestion notification traffic on the link.

11. The apparatus of claim 8 wherein the network device is a core router and said admission threshold is transmitted to the core router for use in marking traffic.

12. The apparatus of claim 8 wherein the network device is an edge router and said preemption-to-admission ratio is transmitted to the edge router.

13. The apparatus of claim 8 wherein calculating said preemption-to-admission threshold comprises calculating a ratio between said second bandwidth utilization and said first bandwidth utilization for each of the links and selecting a minimum ratio for said preemption-to-admission ratio.

14. An apparatus comprising:
means for receiving at a processor traffic information comprising a first bandwidth utilization on each link located between one or more ingress nodes and one or more egress nodes based on a traffic matrix with no failures at the nodes or the links, and a second bandwidth utilization on each of the links based on said traffic matrix with planned failures at one or more of the links or the nodes;
means for calculating a preemption-to-admission ratio based on said second bandwidth utilization and said first bandwidth utilization on the links;
means for calculating an admission threshold at one of the links based on said second bandwidth utilization on the link and said preemption-to-admission ratio; and
means for transmitting at least one of said preemption-to-admission ratio and said admission threshold to a network device for use in flow admission.

15. The apparatus of claim 14 further comprising means for determining a constant based on a bandwidth capacity available for pre-congestion notification traffic and said second bandwidth utilization on the links and wherein means for calculating said admission threshold further comprises means for multiplying said second bandwidth utilization on the link by said constant.

16. The apparatus of claim 14 further comprising means for calculating a preemption threshold at the link comprising means for multiplying said second bandwidth utilization on the link by a minimum ratio of a bandwidth capacity available for pre-congestion notification traffic and said second bandwidth utilization on the links.

17. The apparatus of claim 14 further comprising:
means for calculating a preemption threshold on the link based on said second bandwidth utilization on the link;
means for determining if said preemption threshold is less than a bandwidth capacity available for pre-congestion notification traffic on the link; and
means for increasing said admission threshold and said preemption threshold if said preemption threshold is less than said bandwidth capacity so that said preemption threshold is generally equal to said bandwidth capacity available for pre-congestion notification traffic on the link.

18. The apparatus of claim 14 wherein the network device is a core router and means for transmitting at least one of said preemption-to-admission ratio and said admission threshold comprises means for transmitting said admission threshold to the core router for use in marking traffic.

19. The apparatus of claim 14 wherein the network device is an edge router and means for transmitting at least one of said preemption-to-admission ratio and said admission threshold comprises means for transmitting said preemption-to-admission ratio to said edge router.

20. The apparatus of claim 14 wherein means for calculating said preemption-to-admission ratio comprises means for calculating a ratio between said second bandwidth utilization and said first bandwidth utilization for each of the links and selecting a minimum ratio for said preemption-to-admission ratio.

* * * * *